(12) United States Patent
Gai

(10) Patent No.: US 6,749,769 B2
(45) Date of Patent: Jun. 15, 2004

(54) CRYSTALLINE COMPOSITIONS OF DOPED ALUMINUM PHOSPHATE

(75) Inventor: Pratibha Laxman Gai, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/092,115

(22) Filed: Mar. 6, 2002

(65) Prior Publication Data

US 2002/0148996 A1 Oct. 17, 2002

Related U.S. Application Data

(60) Provisional application No. 60/274,531, filed on Mar. 9, 2001.

(51) Int. Cl.$^7$ .............................................. C04B 35/447
(52) U.S. Cl. .................... 252/62.9 R; 501/153; 501/127; 501/128; 423/311; 423/305; 502/208; 502/214
(58) Field of Search ................. 501/153, 127, 501/128; 252/62.9 R; 423/311, 305; 502/208, 214

(56) References Cited

U.S. PATENT DOCUMENTS 3,519,445 A   7/1970   MacDowell et al.
5,096,857 A   3/1992   Hu et al.

FOREIGN PATENT DOCUMENTS

| EP | 0319146 | 6/1989 |
|---|---|---|
| GB | 461570 | 8/1932 |
| GB | 2209521 | 5/1989 |
| WO | WO 92/00929 | * 1/1992 |

OTHER PUBLICATIONS

Mooney, et al. The Crystal Structure of Aluminum Phosphate and Gallium Phosphate, Low–Cristobalite Type, Acta Cryst. (1956), vol. 9, pp. 728–734 (Washington, DC).
Rokita, et al. Pr. Kom. Nauk., Ceram. Pol. Akad. Nauk (1997), vol. 54, pp. 161–167 (Poland).
Wright, et al. The structures of the B–cristobalite phases of SiO2 and AlPO4, School of Chemistry, pp. 1391–1401.
Handke, et al. Spectroscopic studies of SiO2–AlPO4 solid solutions, Vibrational Spectroscopy, (1999) vol. 19, pp. 419–423.
Saltzberg, et al. Synthesis of Chemically Stabilized Cristobalite, Journal of American Ceramic Society (1992), vol. 75, No. 1, pp. 89–95 (Delaware).
Gai–Boyes, et al. Structures and Stabilization Mechanisms in Chemically Stabilized Ceramics, Journal of Solid State Chemistry, (1993) vol. 106, pp. 35–47.

* cited by examiner

Primary Examiner—C. Melissa Koslow

(57) ABSTRACT

The disclosed invention relates to novel crystalline compositions which may be obtained by doping the alpha ($\alpha$) form of AlPO$_4$ ceramics, which find use as piezoelectric materials, stable supports for catalysts, biotechnology uses, and the like.

28 Claims, 15 Drawing Sheets ized AlPO$_4$ phase/composition).

CRYSTALLINE COMPOSITIONS OF DOPED ALUMINUM PHOSPHATE

This application claims the benefit of U.S. Provisional Application No. 60/274,531, filed Mar. 9, 2001, which is incorporated herein as fully as if set forth at length.

FIELD OF THE INVENTION

This invention relates to novel crystalline compositions obtained by doping the alpha ($\alpha$) form of aluminum phosphate ceramics.

TECHNICAL BACKGROUND

The cristobalite phase of aluminum phosphate (AlPO$_4$) ceramic exists in two modifications, the low temperature cristobalite (denoted as, low cristobalite, or $\alpha$-form) and the high temperature cristobalite (high cristobalite, or $\beta$-form). The two modifications are separated by a reversible phase transformation that occurs at about 270° C. The phase transformation results in abrupt volume and structural changes and discontinuous thermal expansion, which are not conducive to technological applications. Structures of the $\alpha$- and $\beta$-phases have been reported by various researchers including Wright and Leadbetter (*Phil. Mag.* 31, 1391, 1975). AlPO$_4$ is isomorphous with silica and exists with silica in various forms including the $\alpha$-cristobalite form, with phase transformations at similar temperatures. The structure of the alpha form of AlPO$_4$ is tetragonal, a=b=5.03 Angstroms and c=7.00 Angstroms with space group C222$_1$. The structure of the $\alpha$-AlPO$_4$ phase is similar to corresponding silica structures with Al and P atoms alternately replacing the silicon atoms. (Mooney, *Acta Cryst.* 9, 728, 1956) The structure of $\beta$-AlPO$_4$ shows a cubic structure, space group F-43m, with a ~7.2 Angstroms.

It is well known in the glass ceramics field that high temperature forms of silica can be formed at relatively low temperatures by stabilizing the ceramic matrix with dopants. The silica counterpart of the aluminum phosphate materials described above (tetragonal $\alpha$-cristobalite) undergoes a displacement phase transition to the cubic high temperature $\beta$-phase at about 300° C. Various reports regarding the stabilization of cristobalite phases of silica ceramics by various methods have been issued. U.S. Pat. No. 5,096,857, M. A. Saltzberg, et al., *J. Amer. Ceram. Soc.* 1992, 75, 89, and P. L. Gai, et al., *J. Solid State Chemistry*, 1993, 106, 35, all describe chemically stabilized solution-derived silica $\beta$-cristobalite of the type Ca$_x$Al$_y$Si$_{1-x-y}$O$_2$ and its compositions. R. D. Shannon, et al., *Phys. and Chem. Miner.* 1992, 19, 157, reported compositions in the BPO$_4$/AlPO$_4$/SiO$_2$ system (BAPOS), with compositions up to 75% AlPO$_4$, 75% SiO$_2$ and 50–60% BPO$_4$. A relatively high amount (approximately 15%) BPO$_4$, was used in these studies. The authors reported the presence of secondary amorphous phases (i.e., the materials were not single phase), and suggested that stabilization could be achieved using only framework ions (i.e., no ions in the interstices).

M. Rokita, et al., *Pr. Kom. Nauk. Ceram. Pol. Akad. Nauk* 1997, 54, 161 describe the synthesis of solid-solutions of SiO$_2$-AlPO$_4$. A single dopant, 20–75% mole % SiO$_2$, was used. The structures and compositions of the solid solution with this single dopant (SiO$_2$) were not determined because the solid solution formed multiphasic systems. Also, a relatively large mole percent (20–75 mole %) of the dopant SiO$_2$ is used in this work. M. Handke, et al., *Vib. Spectr,* 1999, 19(2) 419–423 show spectroscopic data from these compounds and demonstrate that multiphasic systems are formed.

Stable ceramic materials are required for a number of end-uses, including use as piezoelectrical materials (i.e., structured materials which produce electric polarization when mechanical stress is applied), as stable supports in catalysis and biotechnology, as ceramic fillers with low dielectric constants in electronic application and as ceramic coatings for reactor materials.

In view of the foregoing, it is advantageous to develop a stable ceramic material that is single phasic through a wide range of temperatures.

SUMMARY OF THE INVENTION

The present invention relates to a stabilized AlPO$_4$ composition comprising CaO, SiO$_2$ and AlPO$_4$ at a ratio of greater than 0 to less than about 4 mole percent CaO, greater than 0 to less than about 10 mole percent SiO$_2$, greater than about 86 to less than about 100 mole percent AlPO$_4$ The composition more preferably comprises CaO, SiO$_2$ and AlPO$_4$ at a mole percent ratio of greater than 0 to less than about 3 CaO, greater than 0 to less than about 6 SiO$_2$, greater than about 91 to less than about 100 AlPO$_4$ The composition most preferably comprises CaO, SiO$_2$ and AlPO$_4$ at a mole percent ratio of about 2.3 CaO, about 5.7 SiO$_2$, about 92 AlPO$_4$.

The synthesis involves the following steps: preparation of a slurry or sol containing the dopants, gentle drying of the slurry to drive off water and to produce amorphous precursors, and calcination to crystallize the desired phase. These synthesis procedures described below yield powders which are single phase.

The present invention also provides a method for making these compositions, comprising the steps of: admixing an acidic solution of AlPO$_4$ to stoichiometrically appropriate solutions of SiO$_2$ (ammonium stabilized silica sol from DuPont Ludox AS-40) and a calcium oxide source (such as calcium nitrate hydrate) wherein the mole percent ratios are greater than about 86 to less than about 100 AlPO$_4$, greater than 0 to less than about 10 SiO$_2$, greater than 0 to less than about 4 calcium nitrate; and the pH was adjusted to about 2.5. Calcium nitrate is an example of a convenient and economical source of CaO. The admixture is transferred to a continuous stir tank with NH$_4$OH solution to produce a slurry with a pH of about 9. The slurry is gently heated (~70° C.) to dehydrate and form a precipitate. The precipitates are then heated and calcined at different temperatures and X-ray diffraction measurements were performed. Subsequently, electron microscopy analyses were carried out.

Another embodiment of this invention is an AlPO$_4$ composition that has a cubic structure, space group F-43m, with a ~7.2 Angstroms at a temperature of less than about 270° C., particularly a temperature in the range of from room temperature (approximately 25° C.) to about 250° C. Previously known aluminum phosphate ceramics did not have the cubic structure except after having undergone a phase change at a temperature of about 270° C. or more.

DETAILS OF THE INVENTION

The present invention describes novel compositions of stabilized AlPO$_4$, a room temperature (approximately 25° C.) AlPO$_4$-based ceramic containing small amounts of dopants and prepared by a wet chemical method, which essentially exhibits structural characteristics of the high temperature β-phase without undergoing phase transformations. The structural integrity of these novel single phase ceramics is maintained up to at least 1000° C.

Composition Range

The invention is directed to compositions consisting essentially by mole % of at least about 85%–97% AlPO$_4$, about 3%–10% SiO$_2$ and about 0.3%–5% CaO, in which the composition ratio of CaO/SiO$_2$ is at least about 0.1 to 0.5. The most preferred composition of the single phasic stabilized AlPO$_4$ compound is about 2.3CaO to about 5.7SiO$_2$ to about 92AlPO$_4$.

In the molar range disclosed above, the crystalline compositions of the present invention form the stabilized AlPO$_4$ at room temperature and have structural properties of the high temperature β-phase. These crystalline compositions contain excess silica in the molar ratio of CaO to silica (i.e. contain non-equimolar ratios of CaO to silica). It has been found that this excess silica provides an important advantage in forming single phasic stabilized AlPO$_4$. In the range described above, and at the ratios away from the preferred composition of CaO: SiO$_2$: AlPO$_4$ of about 1 to about 2.5 to about 40, small quantities of secondary phases can be present in these cases with the predominantly stabilized AlPO$_4$ phase without generally changing the properties of the compositions of this invention. Compositions containing ratios other than in the range or ratios described above will form quantities of mixed phases (including a mixture of α- and β-), a result which is not desirable.

Ionic Sizes

Previous work has been done on certain transition metals, alkali and alkaline earth oxide dopants in silica cristobalite phases (Gai, et al., J. Solid State Chem. 106, 35, 1993). Although they may form acceptably small amounts of secondary phases, potassium and copper represent alternatives to calcium as dopants in the stabilization of a high temperature AlPO$_4$ phase.

Figure 4A:
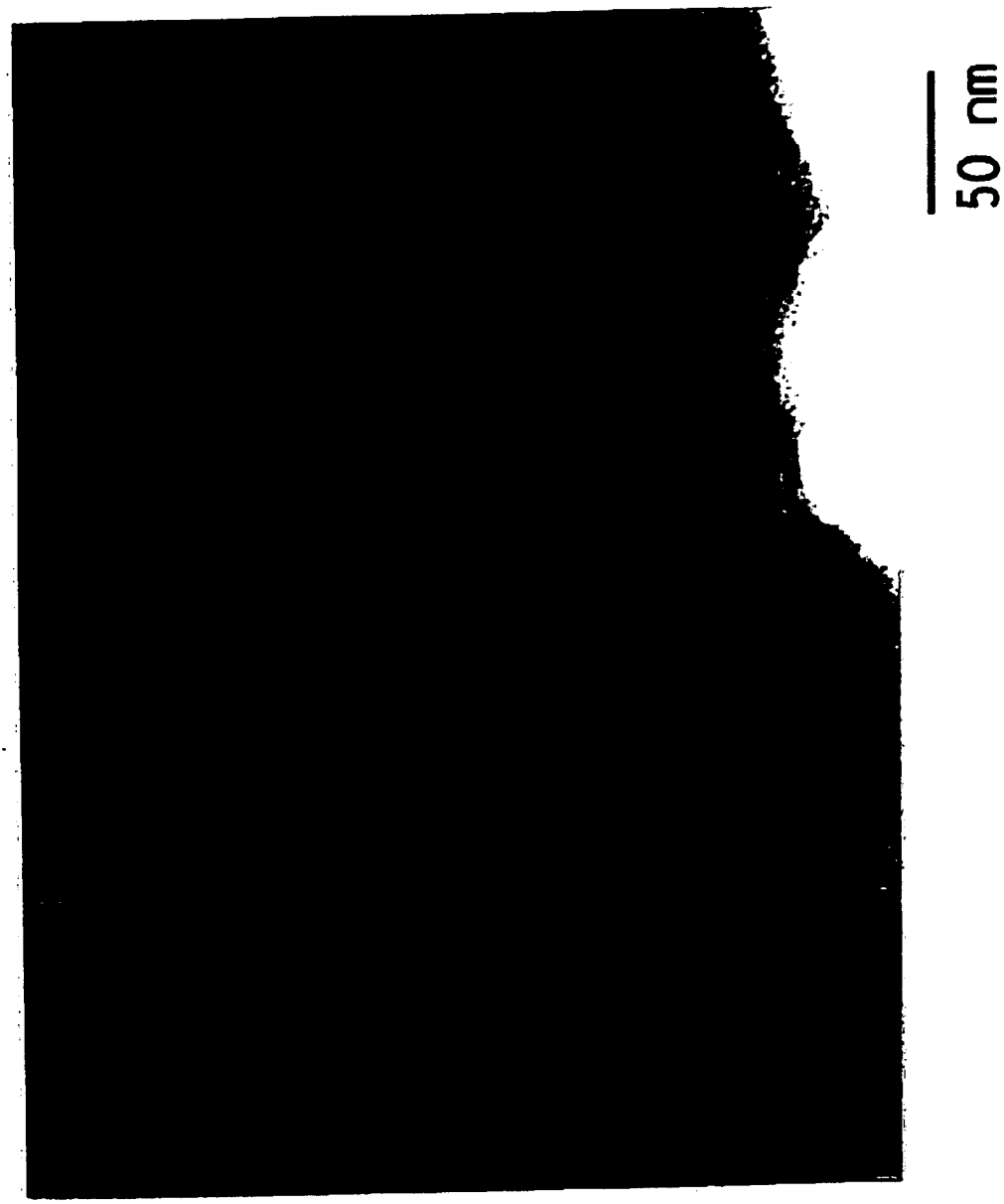
FIG. 4A is an HREM of stabilized AlPO$_4$ (2.3 CaO: 5.7 SiO$_2$: 92AlPO$_4$), showing no defects.
Figure 4B:
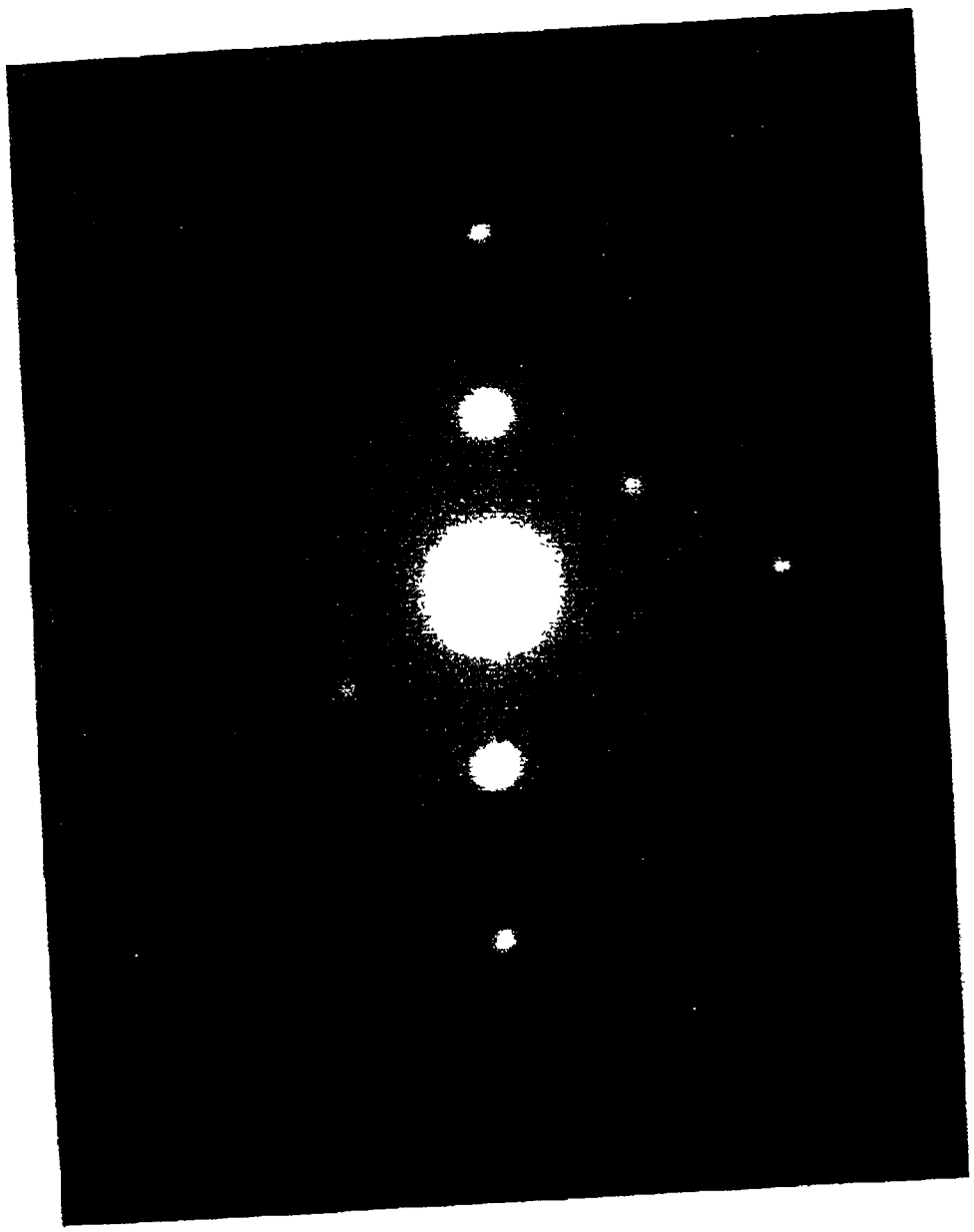
FIG. 4B is an electron diffraction pattern corresponding to FIG. 4A in (110) orientation.
Figure 4C:
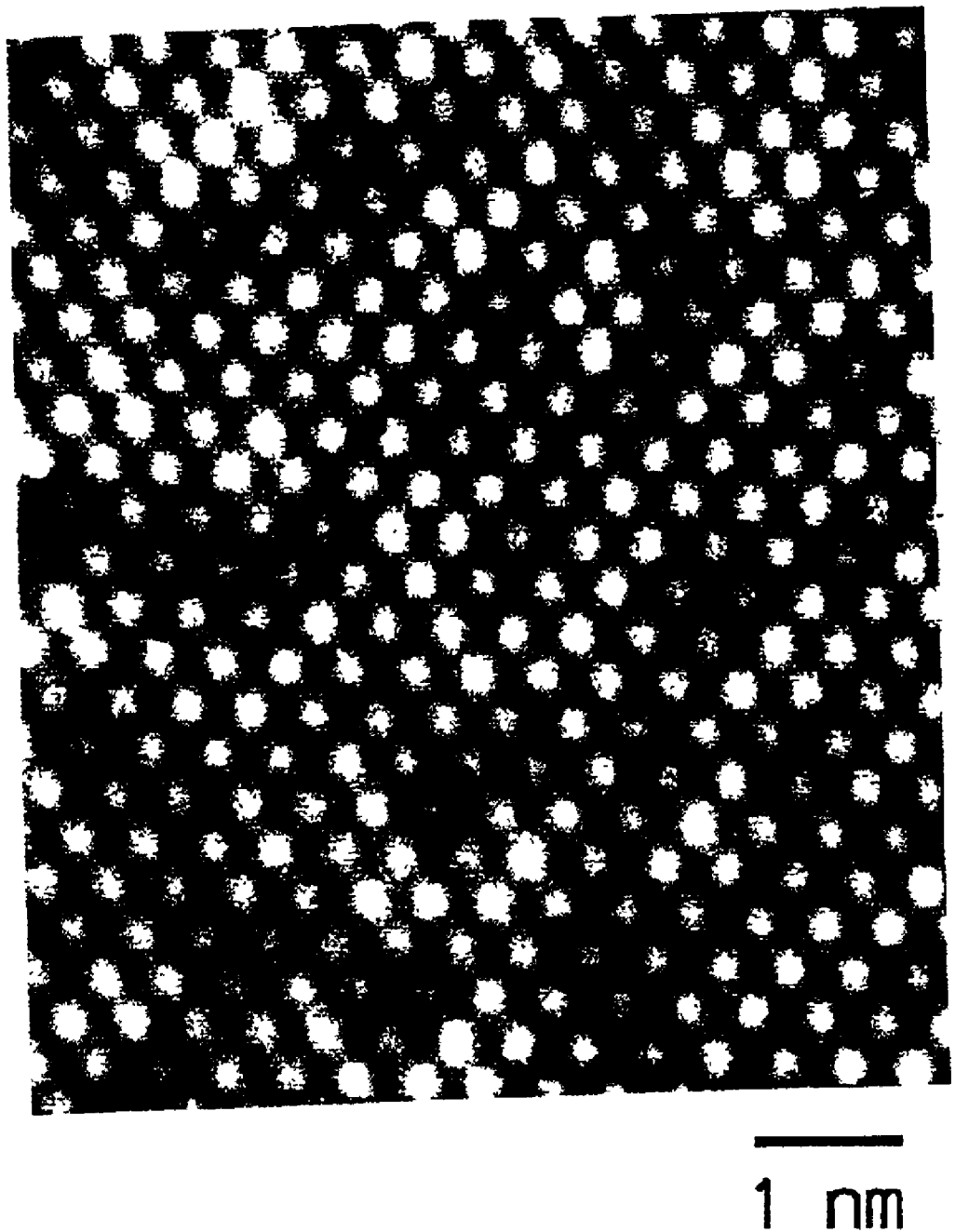
FIG. 4C is an atomic structure image corresponding to FIG. 4A confirming the absence of defects at the atomic level in the sample.
Figure 4D:
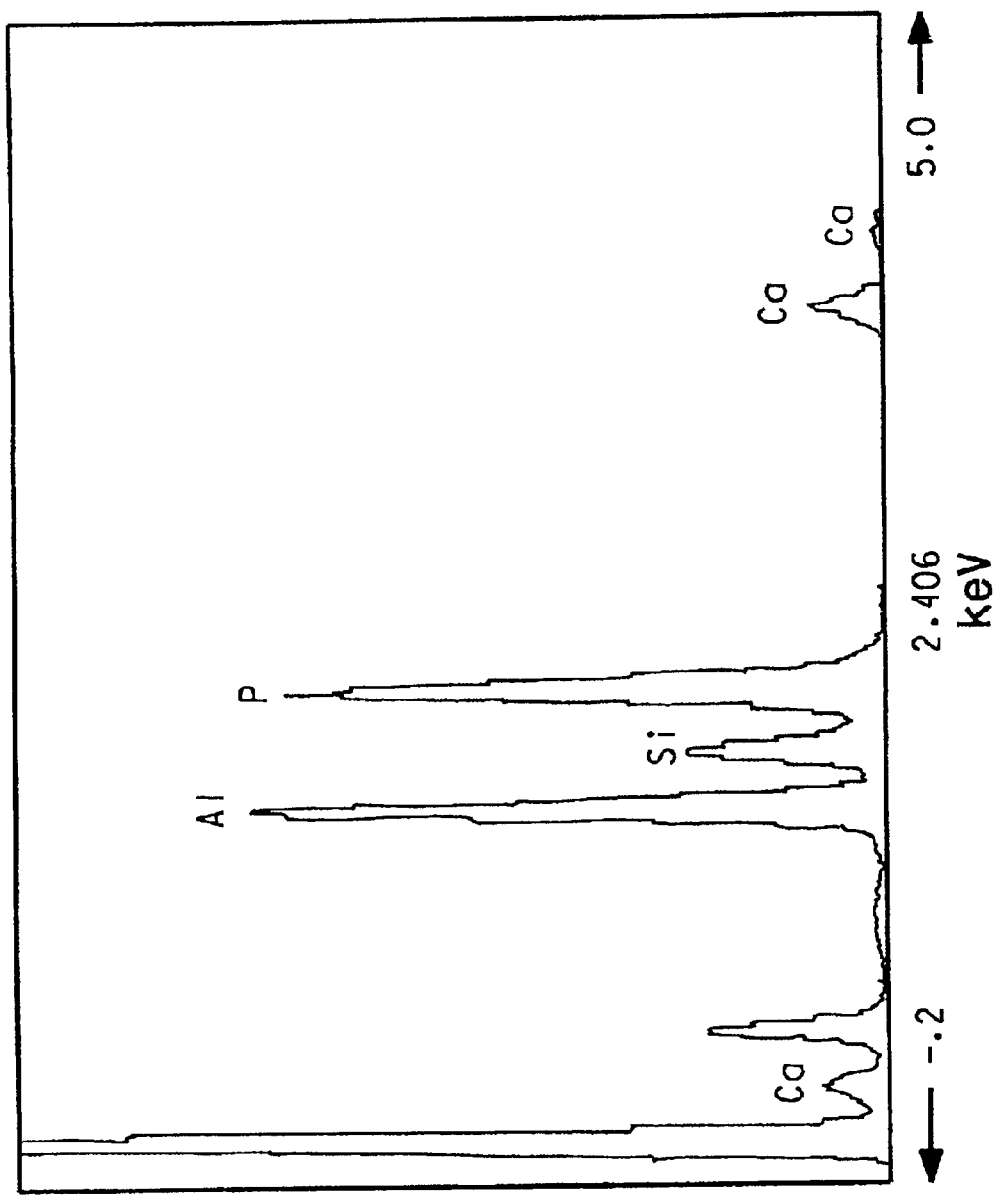
FIG. 4D is an x-ray compositional (chemical) analysis (EDX) showing the presence of Al, P, Si and Ca in the 2.3 CaO: 5.7 SiO$_2$: 92 AlPO$_4$ sample used in FIG. 4A.

Calcium is the preferred dopant. It is possible that stabilization is achieved by incorporating Ca ions in the interstices in the cristobalite framework of AlPO$_4$ to prevent the phase transformation. The Ca ions may be charge-compensated by the substitution of Si ions in the AlPO$_4$ framework consistent with the compositional analyses shown herein (FIG. 4D). This mechanism is similar to the silica analogs described by various workers (e.g. A. J. Perrota et al, J. Amer. Ceram. Soc. 72,441(1989) and Gai et al, J. Solid State Chem. 106,35(1993)). The type of the monovalent, divalent or trivalent cation dopants residing in intersticies is likely determined by the size of the ions (i.e. whether these ions will fit stably in the interstices of the cristobalite structure). Ca has an ionic radius of 1.0 Angstroms (R. D. Shannon Acta Cryst. A32, 751, 1976). K and Cu have comparable ionic radii making K and Cu acceptable substitutes for Ca.

Microstructure and Chemical Composition Analyses

Electron Microscopy (EM) Procedures

To understand the microstructure, morphology and chemical composition of the ceramics, a combination of high resolution transmission EM (HREM) with atomic resolution, high resolution low voltage scanning EM (LVSEM) and scanning transmission electron microscopy (STEM) were used. These are described below.

High precision chemical compositional analyses were carried out by electron stimulated energy dispersive X-ray compositional spectroscopy (EDX), to provide high spatial resolution on the (sub) nanometer scale. Chemical composition from localized regions of the ceramic particles follows below. The analyses were carried out using a commercial Vacuum-Generators field emission-gun HB501-STEM and the data were confirmed by using advanced Philips CM200 field emission gun HREM/STEM instrument. Additionally, atomic structural investigations at different temperatures were performed using a modified Philips CM30 environmental-HREM (EHREM) fitted with a sample-heating stage (ref: P. L. Gai, DuPont: published in Advanced Materials, Vol. 10, p. 1259, 1998), and a Philips CM20 HREM All the EMs were equipped with X-ray spectrometers to analyze chemical compositions.

For compositional studies, analyses were recorded from many dozens of crystals in the sample using an electron nanoprobe. For quantitative chemical microanalysis, a ratio method was used and is given by: C(a)/C(b)=constant factor (I (a))/I (b), where C(a) and C(b) are concentrations of the elements a and b, and I(a) and I(b) are the background subtracted peak intensities of (a) and (b) in the X-ray spectrum, using the procedures described by Cliff, G. and Lorimer G. W., J. Microscopy, vol 103, p. 203, 1975. The analyses were calibrated using a standard of single-phase silica and aluminum phosphate compounds.

Complementary experiments on microstructure, morphology and microchemistry of the new ceramic compositions were also performed using a Hitachi high resolution S5000 LVSEM (ref: E. D. Boyes, DuPont: published in *Adv. Materials*, Vol.10, p.1277, 1998). Microstructures and surface topography of the ceramic samples were recorded.

Description of Crystalline Structures

In the present invention, the structure of the stabilized (room/low temperature) composition of $AlPO_4$ with dopants of CaO and silica, is isomorphous with the high temperature $\beta$-$AlPO_4$ phase, showing a cubic structure with a ~7.2 angstroms, by electron and X-ray diffraction.

Potential uses for the stable ceramic materials made by this invention include, but are not limited to, piezoelectric materials, stable supports for catalysis and biotechnology, as ceramic fillers with low dielectric constants in electronic applications, and as ceramic coatings for reactor materials.

As used herein, the term "stabilized" means room or low temperature ceramics containing small amounts of dopants, exhibiting high temperature ceramic phase properties without undergoing phase transformations. When "stabilized" is used with "composition" or "single phasic", its meaning is extended to include long range order, better sintering properties and higher stability in the presence of molten glass.

As used herein, "phase transformation" refers to the transformation from a low temperature $\alpha$-phase to a high temperature $\beta$-phase.

EXAMPLES

Example 1

Stabilization of $AlPO_4$ with CaO and Silica

To prepare a 92 mole % $AlPO_4$ solution, 112.18 g $AlPO_4$ was mixed in 900 mL water and adjusted pH to 2.5 with concentrated $HNO_3$. In a separate beaker, 3.42 g Ludox AS40 (40% $SiO_2$ solution) was mixed with 20 mL of water and pH adjusted to 2.5 with concentrated $HNO_3$ to prepare a 5.7 mole % $SiO_2$ solution. To prepare a 2.3 mole % $Ca(NO_3)_2$ solution, 1.28 g $Ca(NO_3)_2$ was mixed into 20 mL of water and pH adjusted to 2.5 with concentrated $HNO_3$. Both the $SiO_2$ and $Ca(NO_3)_2$ solutions were added to the aluminum phosphate solution, and transferred to a 3 L flask with heating at 70° C.

A solution of 38 mL concentrated $NH_4OH$ and water was made for a total volume of 1 L. After transfer to a dropping funnel, this solution was added drop-wise to the previously prepared $AlPO_4$ solution to produce a slurry having a pH of 9. The mixed solutions were stirred overnight at 70° C. The material subsequently formed was filtered and heated in furnace at 500° C. for 6 hours. The material was then calcined at different temperatures and tested by x-ray diffraction. Subsequently electron microscopy was performed on the samples.

Figure 2A:
FIG. 2A is a scanning electron microscopy (SEM) image of pure, unstabilized $\alpha$-phase AlPO$_4$.
Figure 2B:
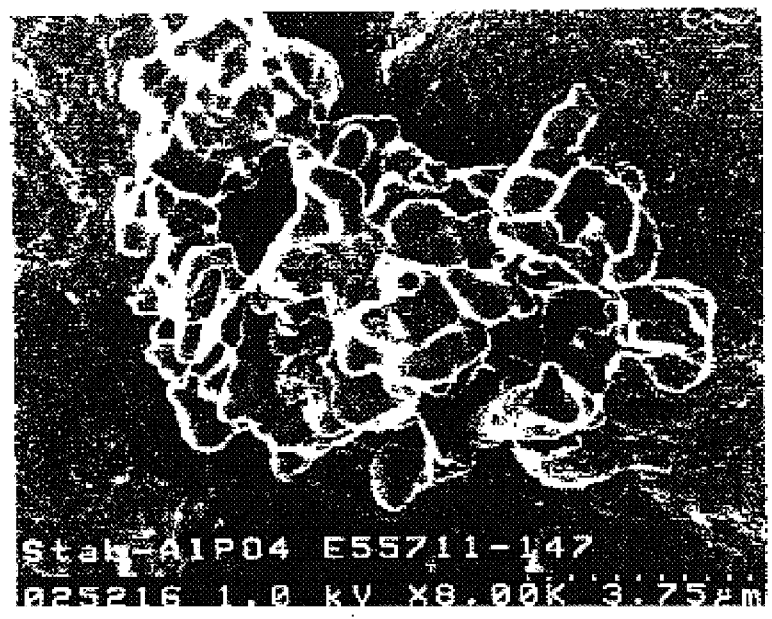
FIG. 2B is an SEM image of stabilized (β-phase) AlPO$_4$.
Figure 3A:
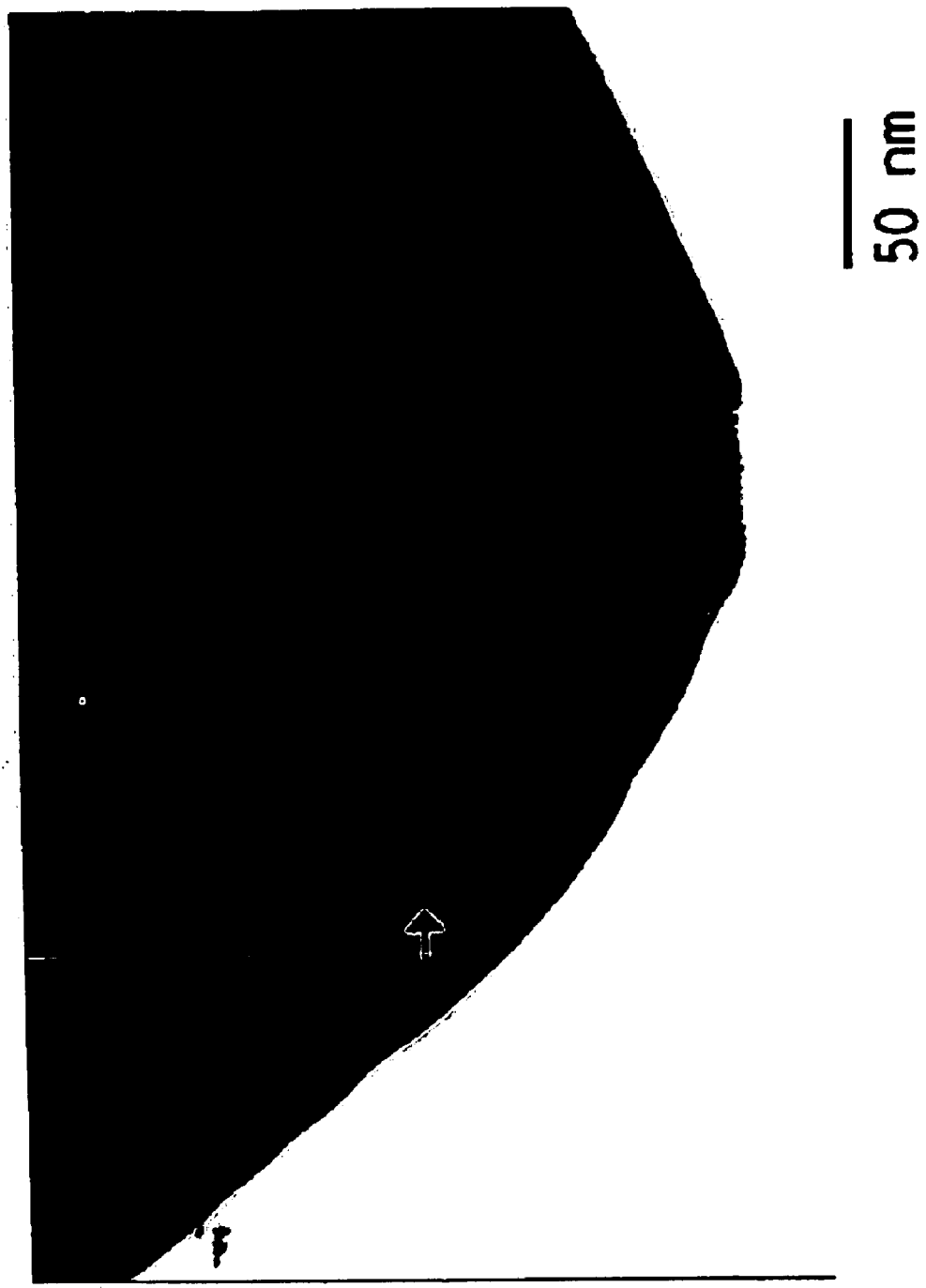
FIG. 3A is a high resolution transmission electron microscopy (HREM) image demonstrating the twin, stacking defects in unstabilized α-phase AlPO$_4$.
Figure 3B:
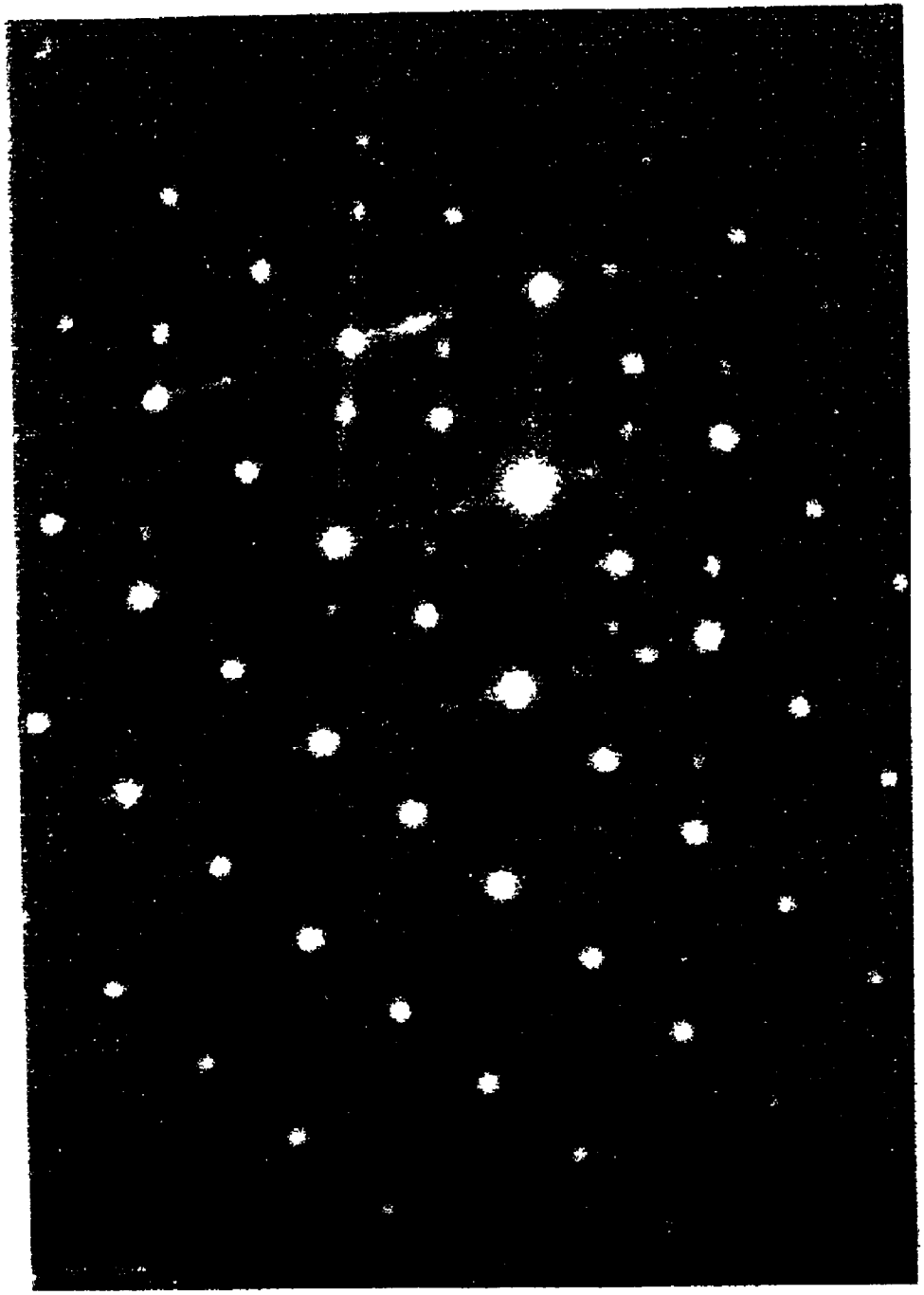
FIG. 3B is an electron diffraction photograph corresponding to FIG. 3A, showing streaks due to the defects in unstabilized α-phase AlPO$_4$.
Figure 3C:
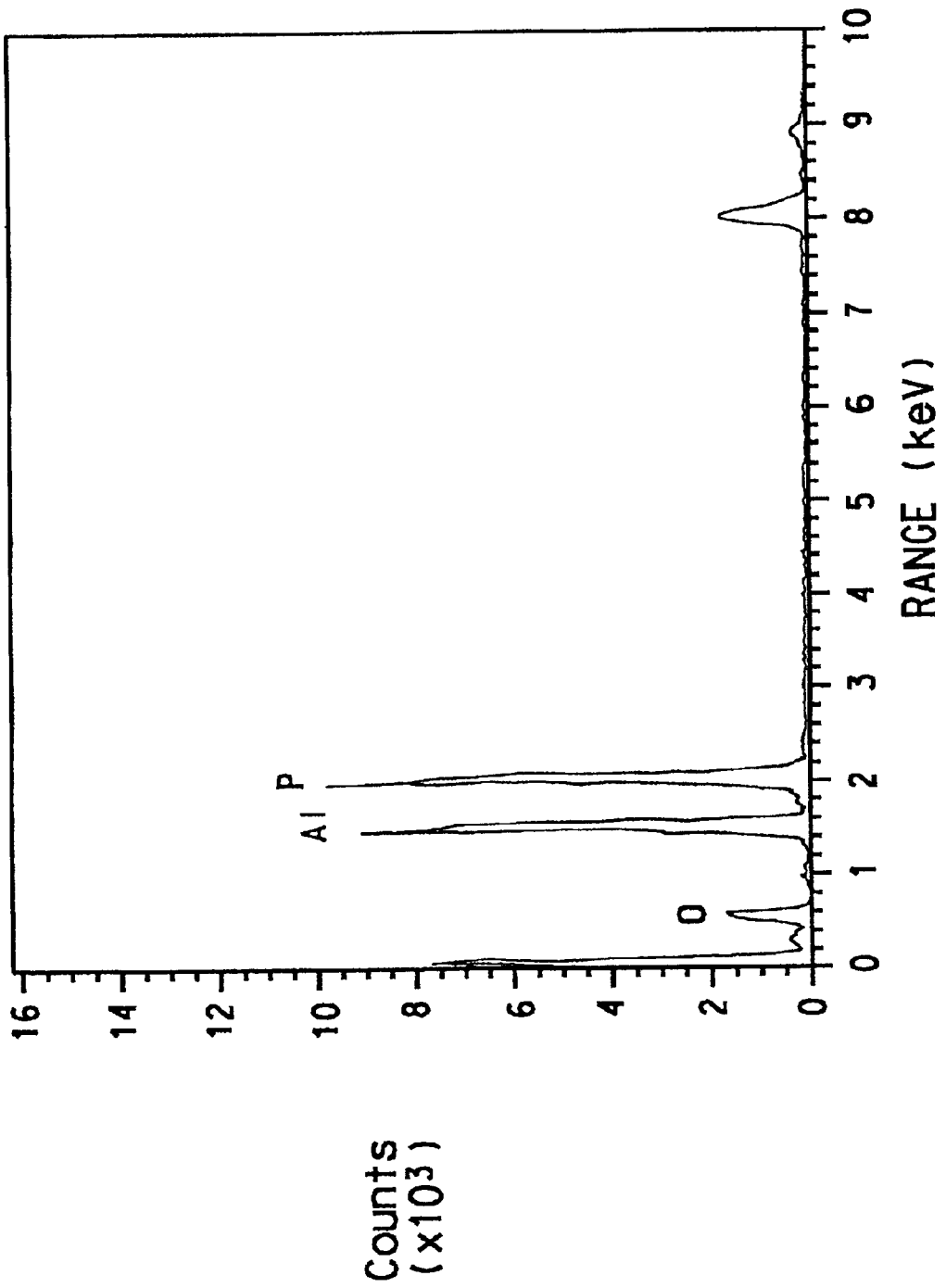
FIG. 3C is an x-ray composition analysis, by energy dispersive x-ray spectroscopy (EDX) showing the presence of Al and P in the oxide shown in FIGS. 3A and 3B.

Microchemical analyses (FIG. 4D) and STEM of this material show the presence of Si and Ca in the structure and the defect-free material suggests framework substitution of Si with divalent cations in interstitial positions (consistent with charge compensating mechanism described by Buerger (1954)) inhibiting the phase inversion. The defect-free stabilized composition is a cubic structure as illustrated by FIGS. 4A, 4B and 4C. The morphology of the stabilized composition has grains with interconnectivity as illustrated by FIG. 2B.

Comparative Example A

Standard Alpha ($\alpha$) Cristobalite Phase of $AlPO_4$ $\alpha$-$AlPO_4$ was analyzed by X-ray diffraction, TEM, electron diffraction, SEM, and EDX according to the methods described above. As shown in FIGS. 2A, 3A, 3B and 3C, the morphology of standard $\alpha$-phase of $AlPO_4$ is different from that of the stabilized material made in Example 1. The structure is tetragonal. The phase has twin-like stacking defect structures, and it undergoes phase transformation.

Comparative Example B 97.5 Mole Percent $AlPO_4$ with 2.5 mole percent $SiO_2$

Figure 1A:
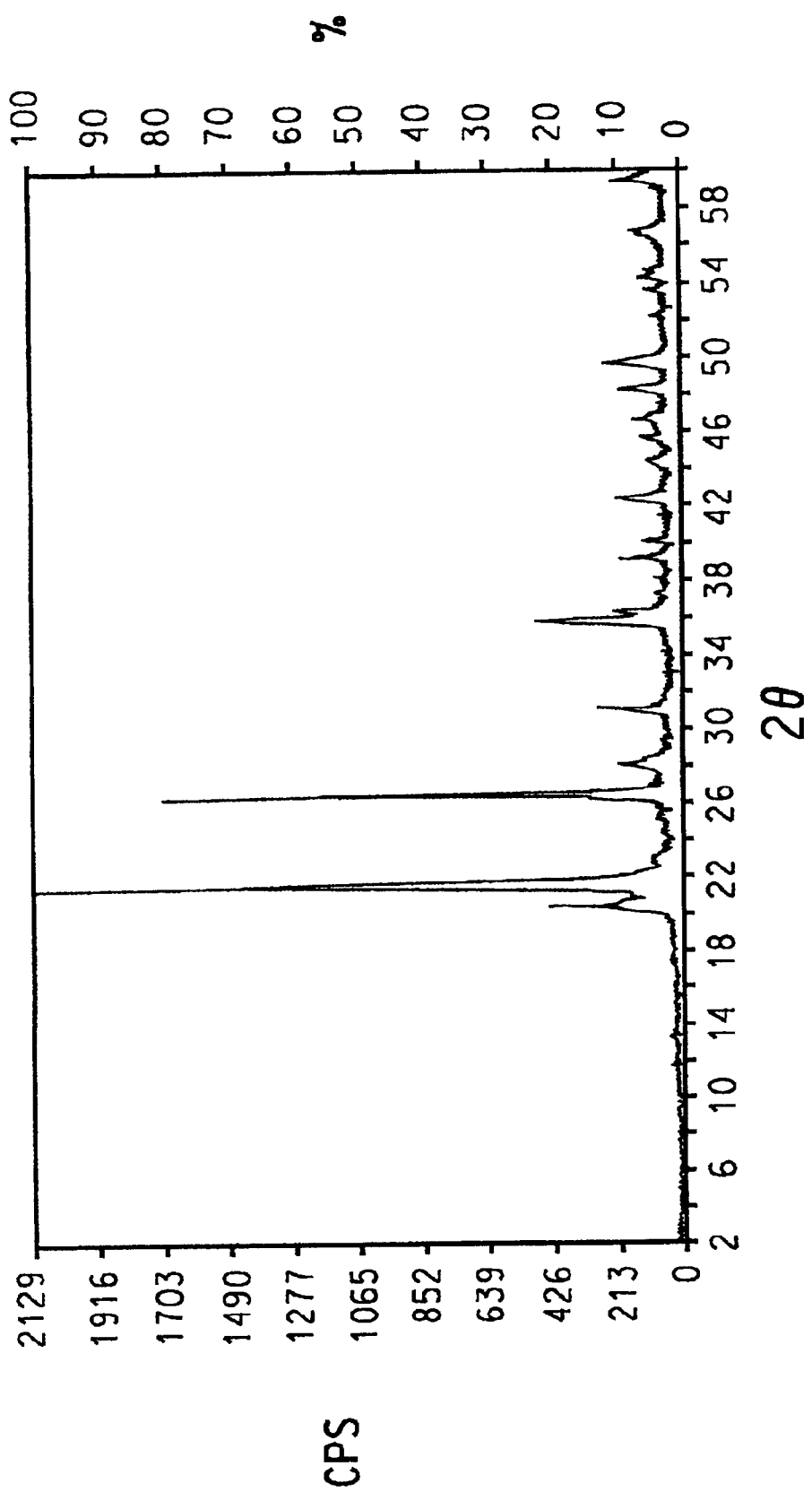
FIG. 1A is an x-ray powder diffraction scan image of pure, unstabilized $\alpha$-phase AlPO$_4$.
Figure 1B:
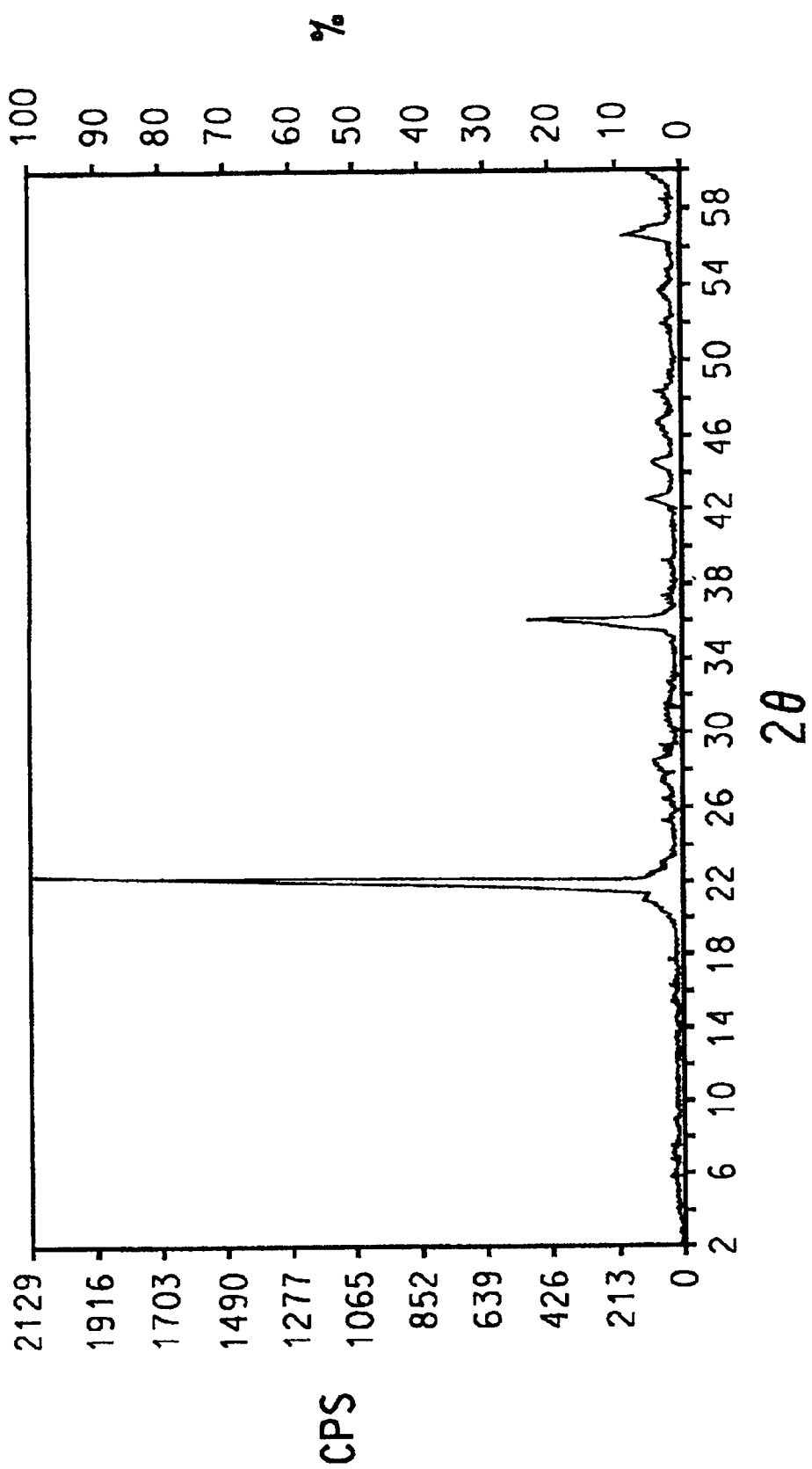
FIG. 1B is an x-ray powder diffraction scan image of stabilized low temperature (room temperature) $\beta$-phase AlPO$_4$, (hereafter referred to as stabilized AlPO$_4$ phase/composition).
Figure 5:
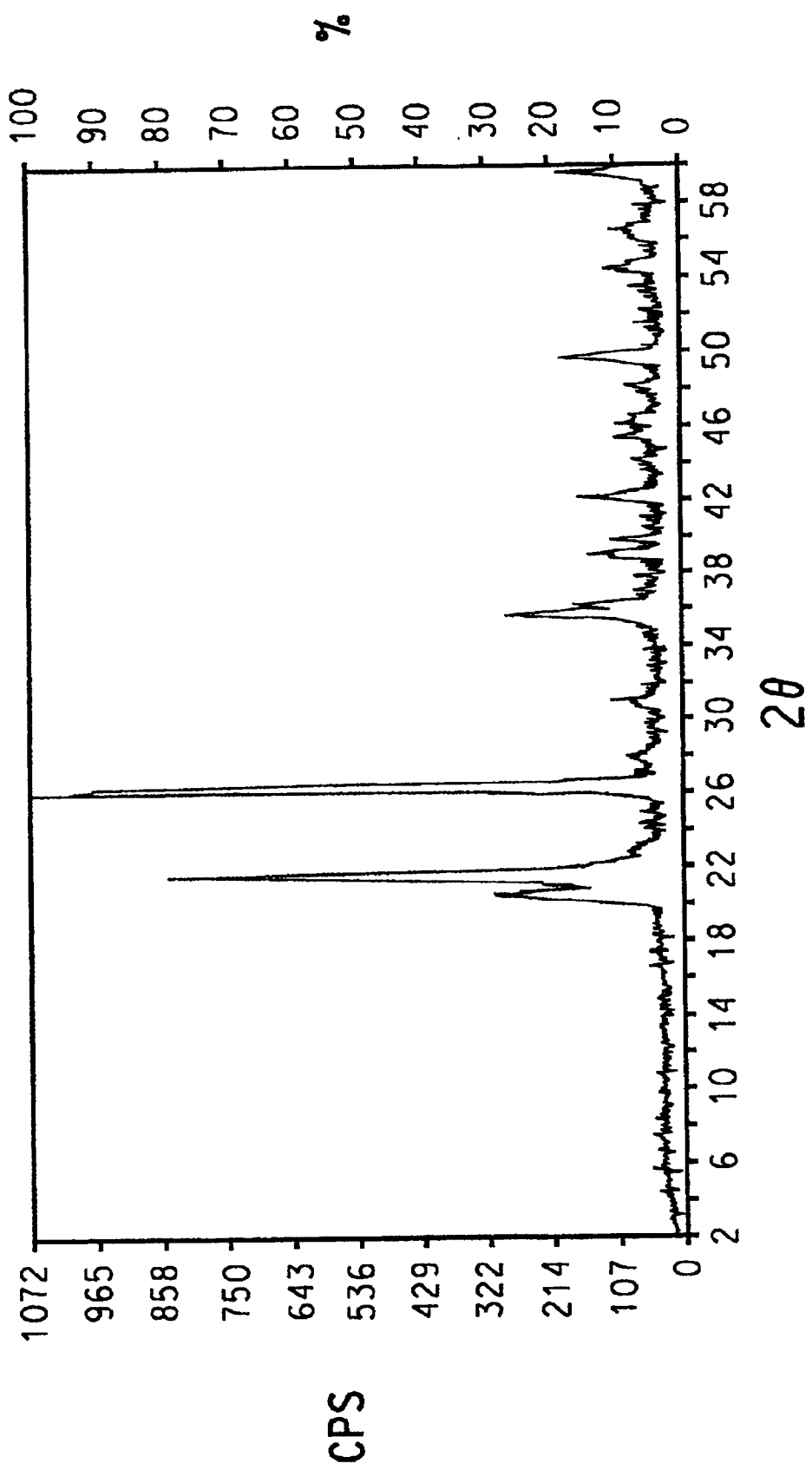
FIG. 5 is an x-ray powder diffraction pattern of the material made in Comparative Example B (2.5 SiO$_2$: 97.5 AlPO$_4$)

A composition of 2.5 mole percent $SiO_2$: 97.5 mole percent $AlPO_4$ was made using the procedure described in Example 1, except that $Ca(NO_3)_2$ was not added. No stabilized composition was noted (see FIG. 5), and the structure appeared very similar to that of the $\alpha$-phase as shown in FIG. 1A.

Comparative Example C

97 Mole % $AlPO_4$ with 3 Mole % CaO

Figure 6A:
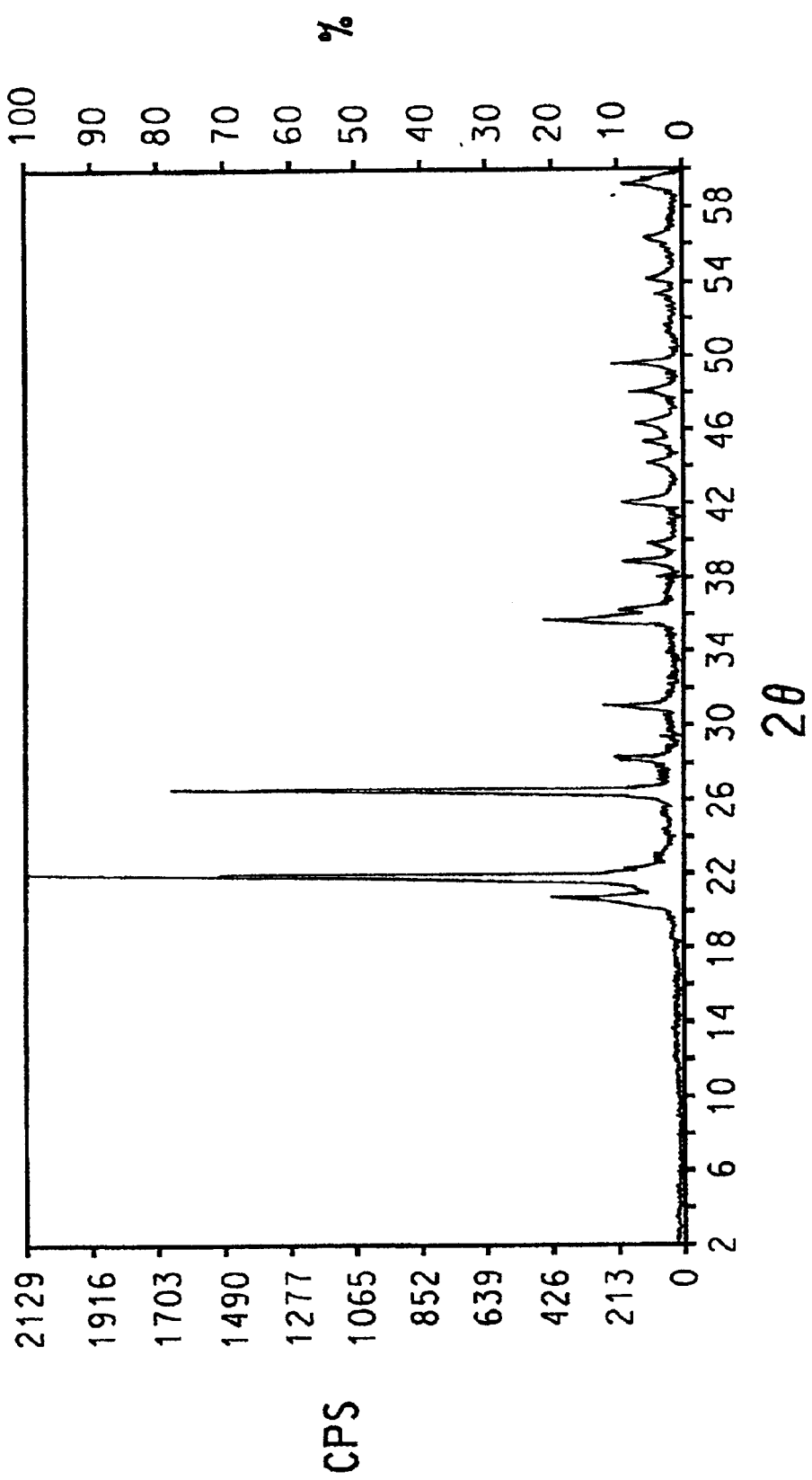
FIG. 6A is an x-ray powder diffraction pattern 20 of the material made in Comparative Example C (3 CaO: 97 AlPO$_4$)
Figure 6B:
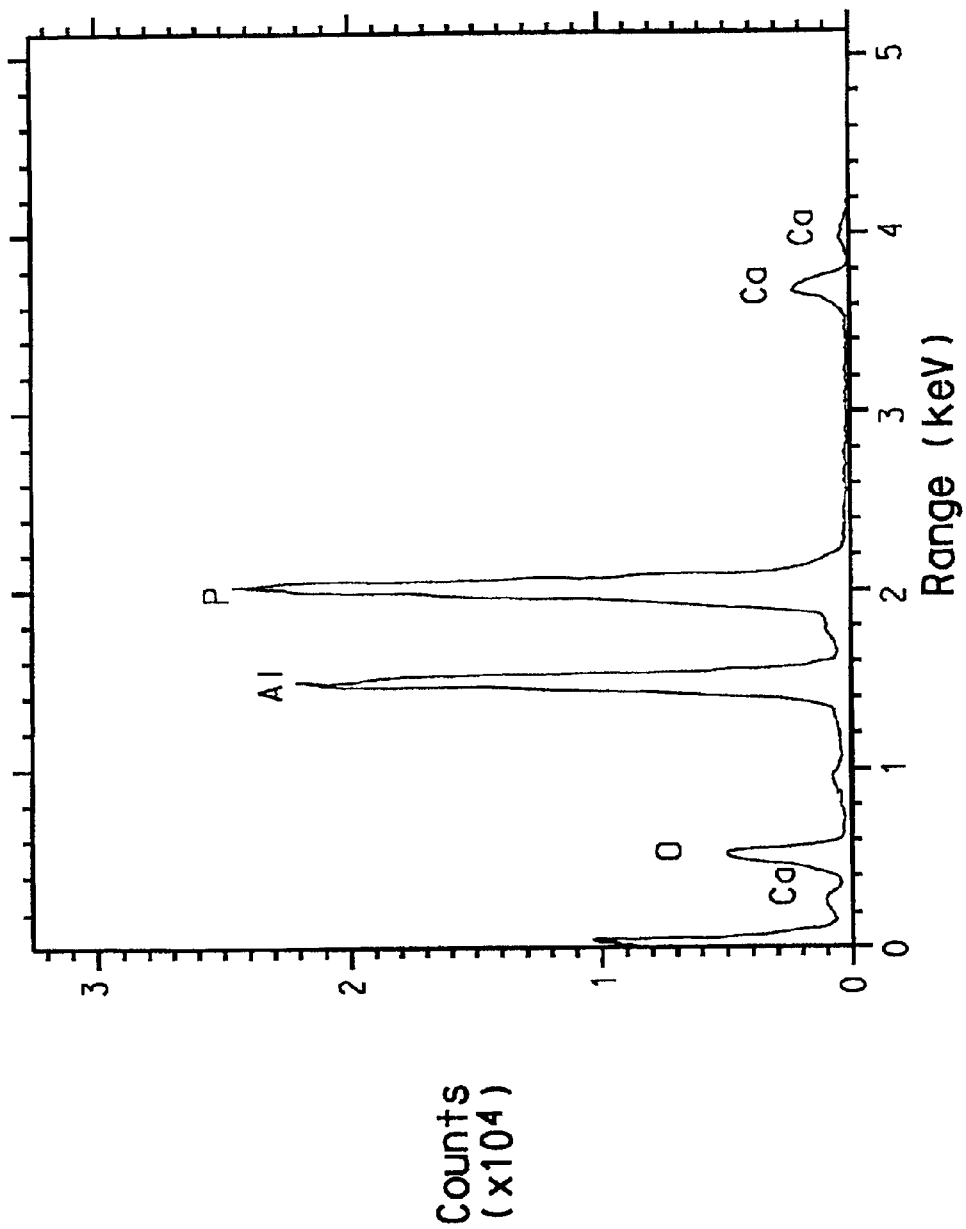
FIG. 6B is an x-ray compositional (microchemical) analysis (EDX) showing the presence of Al, P and Ca (3 CaO: 97 AlPO$_4$).

A composition of 3 mole percent CaO: 97 mole percent $AlPO_4$ was made using the procedure described in Example 1, except that $SiO_2$ was not used. Both x-ray powder diffraction (FIG. 6A) and EDX (FIG. 6B) showed the presence of Al, P and Ca in the oxide, and the structure still appeared very similar to that of the $\alpha$-phase as shown in FIG. 1A.

Comparative Example D $\alpha$- to $\beta$-Phase Transformation of $AlPO_4$

Figure 7A:
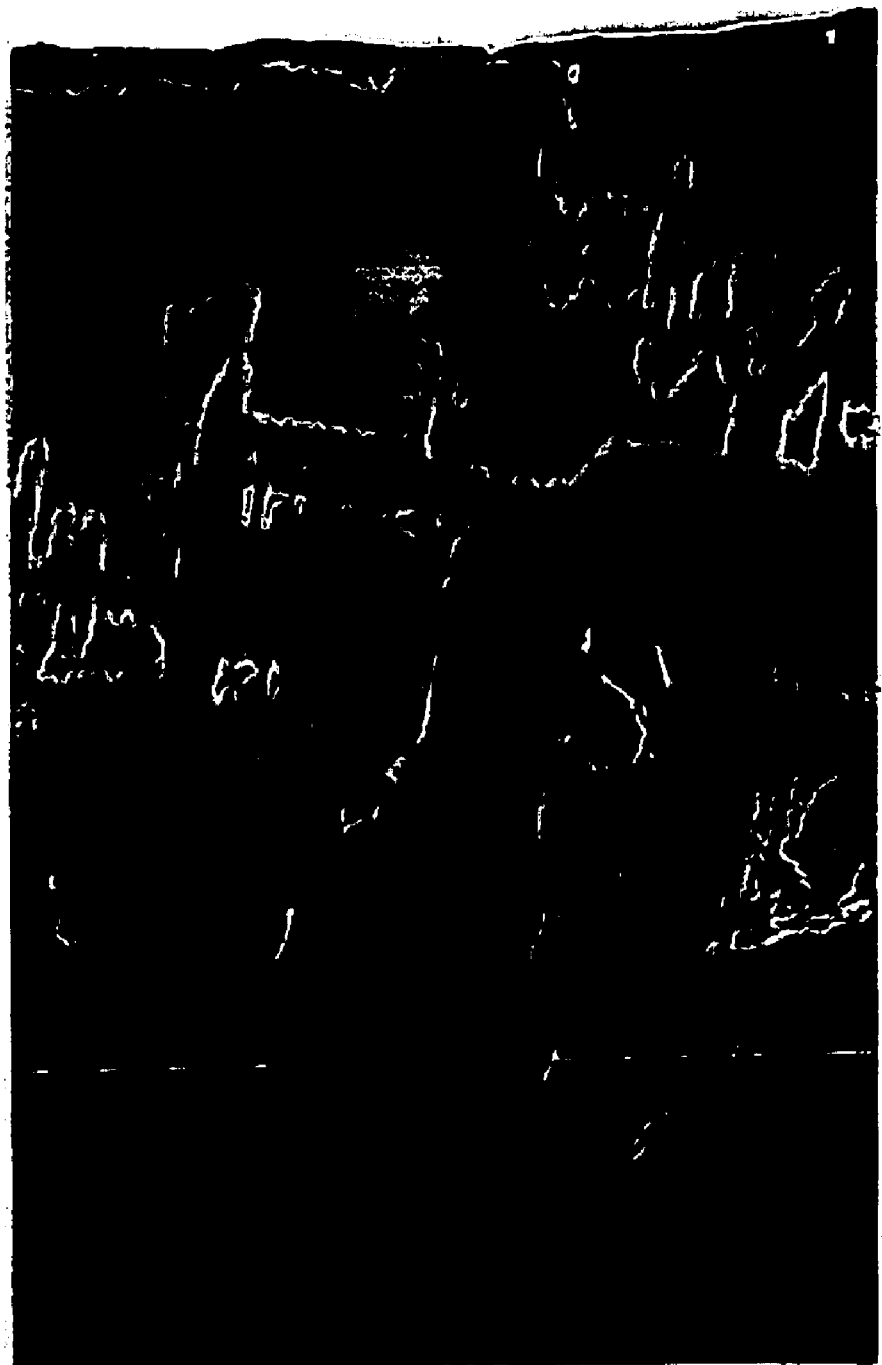
FIG. 7A is an environmental-HREM (EHREM) photograph showing the α-phase AlPO$_4$ with stacking defects at room temperature.
Figure 7B:
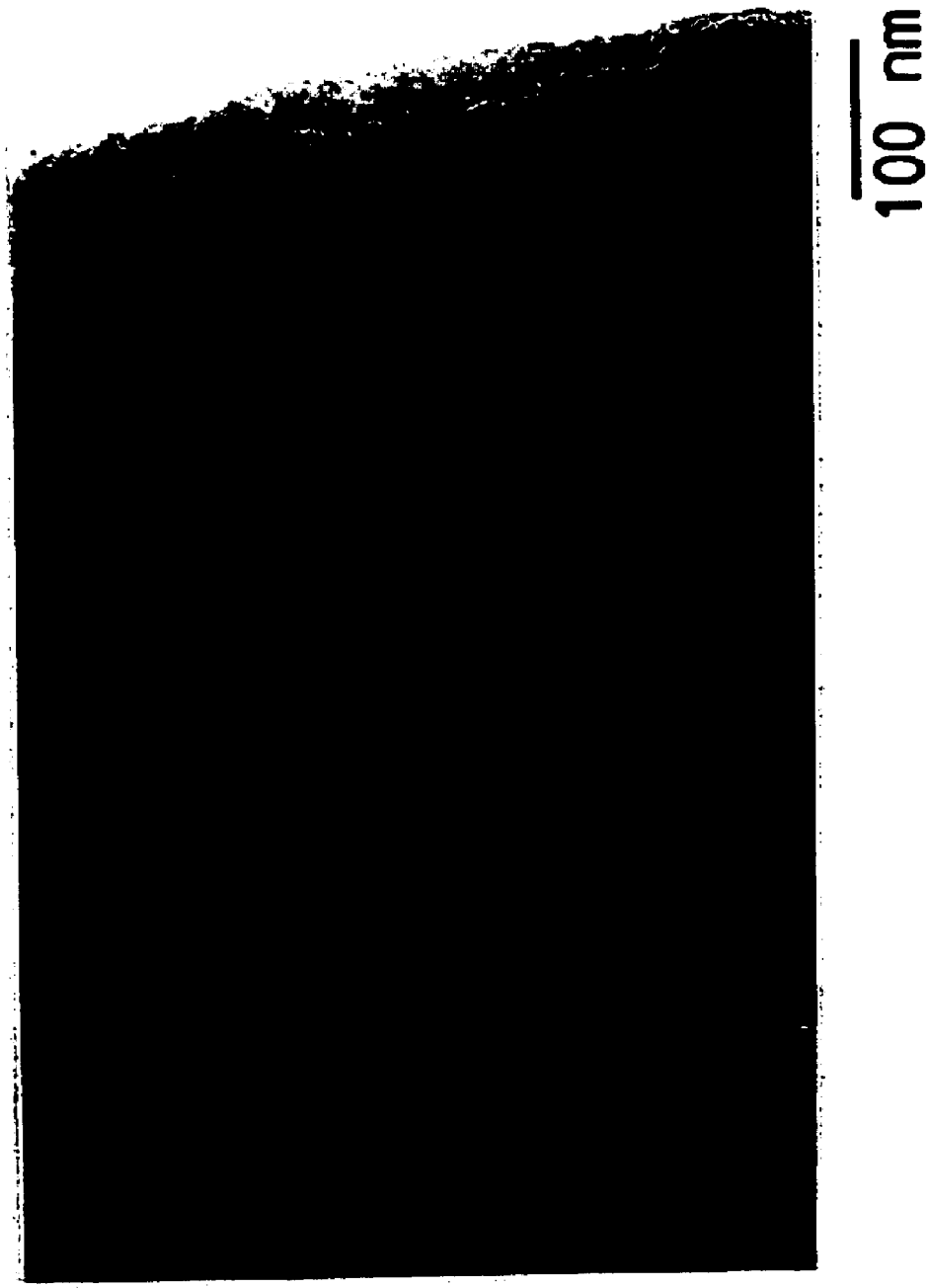
FIG. 7B is an EHREM photograph showing the relatively defect-free β-phase AlPO$_4$ after the α-form in FIG. 7A is heated in-situ to ~270° C.

A sample of standard $\alpha$-cristobalite was placed on the heating stage of the EHREM. As shown in FIG. 7A, there existed stacking defects as would be expected at room temperature. The sample was then heated to about 270° C., when the sample transitioned to the $\beta$-phase. The stacking defects disappeared as shown in FIG. 7B. This confirms the results shown in FIG. 4 for the stabilized composition.

What is claimed is:

1. A stabilized $AlPO_4$ composition comprising CaO, $SiO_2$ and $AlPO_4$ at a ratio of greater than 0 to less than about 4 mole percent CaO, greater than 0 to less than about 10 mole percent $SiO_2$, and greater than about 86 to less than about 100 mole percent $AlPO_4$.

2. The composition of claim 1 comprising CaO, $SiO_2$ and $AlPO_4$ at a mole percent ratio of greater than 0 to less than about 3 CaO, greater than 0 to less than about 6 $SiO_2$, and greater than about 91 to less than about 100 $AlPO_4$.

3. The composition of claim 1 comprising CaO, $SiO_2$ and $AlPO_4$ at a mole percent ratio of about 2.3 CaO, about 5.7 $SiO_2$, and about 92 $AlPO_4$.

4. A composition according to claim 1 which contains excess silica in the molar ratio of calcium oxide to silica.

5. A composition according to claim 1 in the form of a piezoelectrical material, a support in catalysis, a support in biotechnology, a ceramic filler or a ceramic coating.

6. A stabilized $AlPO_4$ composition having a $\beta$ cristobalite structure, and comprising XO, $SiO_2$ and $AlPO_4$ at a ratio of greater than 0 to less than about 4 mole percent XO, greater than 0 to less than about 10 mole percent $SiO_2$, and greater than about 86 to less than about 100 mole percent $AlPO_4$, wherein X is any cation with an atomic radius of about 1 angstrom that fits stably within the interstices of the cristobalite structure.

7. The composition of claim 6 wherein X is potassium.

8. The composition of claim 6 or 7 wherein the mole percent ratio is about 2.3 XO, about 5.7 $SiO_2$, and about 92 $AlPO_4$.

9. A composition according to claim 6 wherein X is copper.

10. A composition according to claim 6 wherein X is calcium.

11. A composition according to claim 10 which contains excess silica in the molar ratio of calcium oxide to silica.

12. A composition according to claim 6 in the form of a piezoelectrical material, a support in catalysis, a support in biotechnology, a ceramic filler or a ceramic coating.

13. A single phase, cristobalite $AlPO_4$ composition that has a cubic structure, space group F-43m, with a ~7.2 Angstroms at a temperature of less than about 270° C. that comprises a silica dopant and a dopant having a cation with an atomic radius of about 1 angstrom that fits stably within the interstices of the cristobalite structure, wherein the cation is selected from the group consisting of calcium, potassium and copper.

14. A composition according to claim 13 wherein the cubic structure is maintained up to at least 1000° C.

15. A composition according to claim 13 which is at a temperature in the range of from room temperature to about 250° C.

16. A composition according to claim 13 wherein the cation is potassium.

17. A composition according to claim 13 wherein the cation is copper.

18. A composition according to claim 13 wherein the cation is calcium.

19. A composition according to claim 18 which contains excess silica in the molar ratio of calcium to silica.

20. A composition according to claim 13 in the form of a piezoelectrical material, a support in catalysis, a support in biotechnology, a ceramic filler or a ceramic coating.

21. A composition according to claim 13 which has not undergone phase transformation.

22. A composition according to claim 21 wherein the cubic structure is maintained up to at least 1000° C.

23. A composition according to claim 21 which is at a temperature in the range of from room temperature to about 250° C.

24. A composition according to claim 21 wherein the cation is potassium.

25. A composition according to claim 21 wherein the cation is copper.

26. A composition according to claim 21 wherein the cation is calcium.

27. A composition according to claim 26 which contains excess silica in the molar ratio of calcium to silica.

28. A composition according to claim 21 in the form of a piezoelectrical material, a support in catalysis, a support in biotechnology, a ceramic filler or a ceramic coating.

* * * * *